G. F. FLYNN.
MOTOR SUPPORT.
APPLICATION FILED AUG. 5, 1919.
1,349,418.
Patented Aug. 10, 1920.
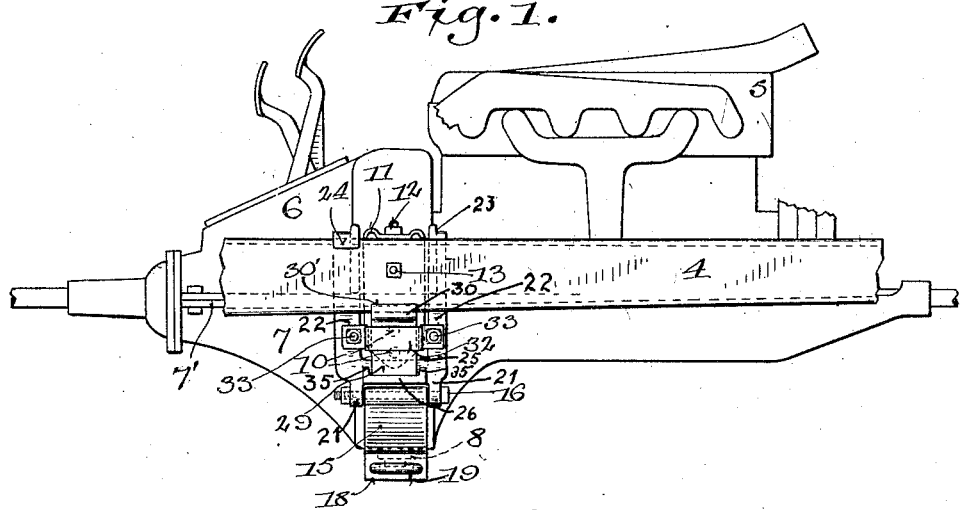
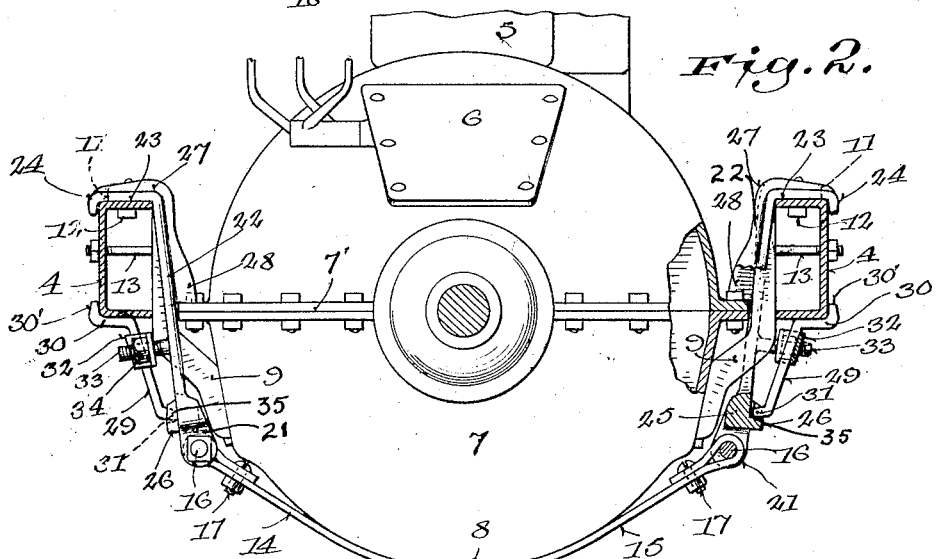
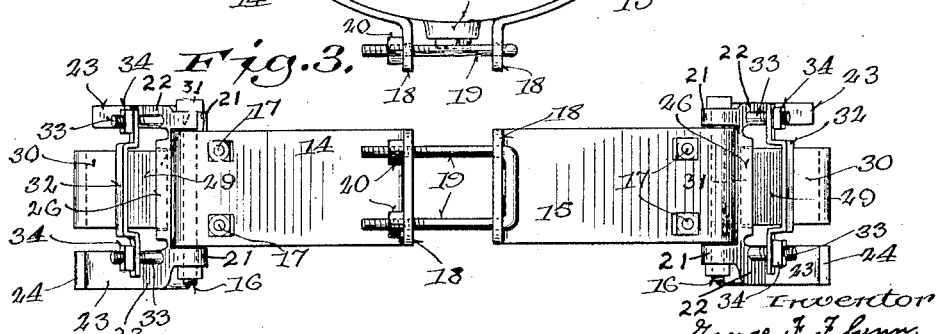

UNITED STATES PATENT OFFICE.

GEORGE F. FLYNN, OF MILWAUKEE, WISCONSIN.

MOTOR-SUPPORT.

1,349,418.  Specification of Letters Patent.  Patented Aug. 10, 1920.

Application filed August 5, 1919. Serial No. 315,438.

*To all whom it may concern:*

Be it known that I, GEORGE F. FLYNN, a citizen of the United States, and resident of Milwaukee, in the county of Milwaukee and State of Wisconsin, have invented new and useful Improvements in Motor-Supports, of which the following is a description, reference being had to the accompanying drawings, which are a part of this specification.

The present invention relates to certain new and useful improvements in automobiles, and more particularly to a support for the crank case of an automobile.

While the invention is particularly designed for a Ford automobile, it may also be used in other types of cars. In the Ford automobile, the crank case is made of pressed steel, and metal brackets are riveted on to the case and secured to the side bars of the automobile. Owing to the shocks and jolts to which the cars are subjected, it frequently happens that the rivets are torn out of the pressed steel crank case or are sheared, disabling the car, and this manner of attachment is one of the most vulnerable points of this particular type of automobile. In order to obliterate these difficulties, I have devised a crank case support which can be placed on a Ford car without the necessity for drilling any holes or removing any bolts, and which will prevent the above mentioned troubles with the usual brackets.

Another object of my invention is to provide an engine crank case support which will be readily attachable or detachable, and which any novice can secure the same to an automobile engine.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of my invention, constructed according to the best mode I have so far devised for the practical application of the principles thereof, and in which:

Figure 1 is a side view of an engine and a portion of an automobile chassis frame illustrating my invention as connected therewith.

Fig. 2 is a rear view of an engine crank case illustrating my invention as attached thereto, parts including the side bars of the automobile chassis frame being shown in section, and Fig. 3 is a bottom plan view of my crank case support detached.

In the drawing, the numeral 4 designates the chassis frame member or side bars of an automobile; 5, the engine; 6, the transmission case; and 7, the pressed steel crank case having a drain plug 8.

In the Ford automobile, a part of which is herein shown, metal brackets 9 are secured to the sides of the crank case adjacent the transmission by rivets 10, and the outwardly extending arms 11 of these brackets are each secured to the top of the adjacent bar 4 by a bolt 12 and another bolt 13 secures the bracket to the sides of the side bars. As previously stated much difficulty has been experienced in the breaking off of these brackets 9 from the crank case.

The device embodying the invention is what might be termed a sling or cradle, preferably of band metal and engaging the crank case and provided with means securing the same to the side bars 4. The cradle or sling is made in two complementary parts 14 and 15 having their outer ends passed around pivot bolts 16 of the side bar engaging means, to be later described, and then secured as at 17. The inner ends of the parts 14 and 15 are flanged downwardly as at 18 and provided with a pair of apertures adapted to receive a U-shaped clip bolt 19 having binding nuts 20 engaged therewith, said U-shaped clip 19 providing means to pass around the boss of the adjacent drain plug 8 and permit a ready access thereto.

As the members carried by the outer ends of the parts 14 and 15 are identical, the description of one will suffice for both. The pivot or bolt 16 is carried by a pair of spaced apart ears or lugs 21 formed on the lower ends of a pair of hook members 22 which extend upwardly from the section 15 between the crank case and the bar 4, and have their upper ends formed with laterally projecting arms 23 engaging the top surface of the bar 4, and have formed on the outer end of the arm 23, lips or hooks 24 abutting the outer side of the bar 4.

The hook members 22 are placed one at each side of the bracket arm 9 as best shown in Figs. 1 and 2, and have their lower ends connected by a transverse portion 25 having an outwardly extending lip or flange 26 for the purpose to be later described, and the forward members 22 are of less width than the other, as best shown in Fig. 1, in order to allow the securement of the device upon the side bar 4 without interfering with the usual body dash bracket, not shown. The members 22 have their upper portions formed with a reinforcing rib 27 which terminates as at 28 to provide a sharp locking shoulder adapted to engage the top side of a laterally projecting flange 7' of the engine crank case 7.

Thus it will be seen that the entire weight of the engine may be supported by the members 22 and the parts 14 and 15. In order to prevent the riding upwardly of the engine, I provide a locking or clamping member 29 having its upper end formed with a side bar receiving portion 30, and its lower end formed with a projection 31 engaged against the flange 26. The member 29 is securely clamped in position by means of a transverse bracket 32 having its ends apertured and engaged by stud bolts 33 carried by the members 22 and secured thereon by means of suitable lock nuts 34. The end 30 of the member 29 has a lip portion 30 engaging the side of the bar 24, and the lower end 31 of said member is confined between two side projections or lugs 35 extending upwardly from the flange 26 to prevent the dislodgment of the projection 31 from the flange 26.

From the foregoing description, taken in connection with the accompanying drawing, it will be readily seen that the movement of the engine with respect to the chassis frame or side bars 4 is prevented as the member 29 prevents the securing means for the sling from moving upwardly or downwardly, and the engine is firmly held against the sling by means of the tension on the clip 19 binding the portions of the parts 14 and 15 of the sling tightly thereagainst and the locking shoulders 28 of the members 22 impinging the top side of the flange 7'.

It will also be readily understood that the device is so simple that a novice can readily attach the same as it is unnecessary that any holes be drilled or any adjusting be made except that the nuts 20 and 34 be securely tightened.

What I claim as my invention is:

1. A crank case support for engines comprising a crank case receiving sling, chassis frame engaging members carried by said sling, and means carried by said members and engageable with the crank case to prevent the movement thereof away from the sling.

2. A crank case support for engines comprising a crank case engaging band, readily detachable clamping members carried by the outer ends of said band and engaging the side bars of the chassis frame, and means integral with said clamping members adapted to abut the crank case to firmly retain the same on said band.

3. In a device of the class described, a two-part sling adapted to support an engine crank case, means adjustably connecting the inner ends of said sling, hook members pivotally carried by the outer ends of said sling and adapted to engage the top of the side bars of a chassis frame, and means detachably carried by said hook members and engageable with the under side of said chassis frame side bars to readily detachably secure said hook members and sling to said side bars.

4. In a device of the class described, a two-part sling adapted to support an engine crank case, means adjustably connecting the inner ends of said sling, hook members carried by the outer ends of said sling and adapted to engage the side bars of a chassis frame, means detachably carried by said hook members and engageable with said chassis frame side bars to readily detachably secure said hook members and sling to said side bars, and means integral with said hook members and engageable with said crank case to firmly strap the same to said sling.

5. A chassis frame side bar engaging member for a crank case support comprising a side bar engaging member having two arms, hook members formed at the upper ends of said arms and adapted to engage the chassis frame side bar, reinforcing ribs for said side arms, said reinforcing ribs terminating in sharp shoulders adapted to abut the engine crank case, a locking member adapted to engage the lower end of said hook members and the bottom of the side bar to detachably secure the same thereto, and means carried by said hook members for receiving the crank case sling support.

6. In a device of the class described, the combination with an automobile chassis frame, an engine crank case and its attaching flange, of a support for said engine crank case comprising a crank case engaging band, means carried by the outer ends of said band suspending the same from the chassis frame and including hook means for engaging the upper portions of said chassis frame, detachable means engaging the lower portions of said chassis frame and said hook means, and a locking shoulder formed on said hook means medially of its ends and engaged with the flange of the crank case to retain the same upon the crank case supporting band.

In testimony whereof I affix my signature.

GEORGE F. FLYNN.